May 20, 1958 J. G. HAUNERT 2,835,044
GAUGE FOR ROCKER ARM
Filed Jan. 31, 1955
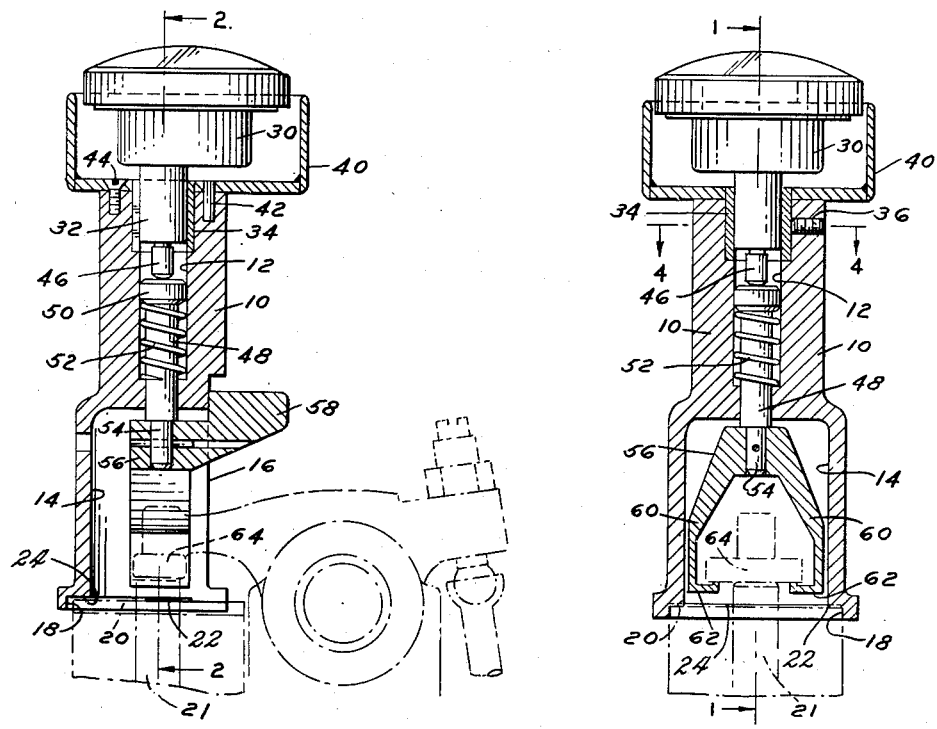
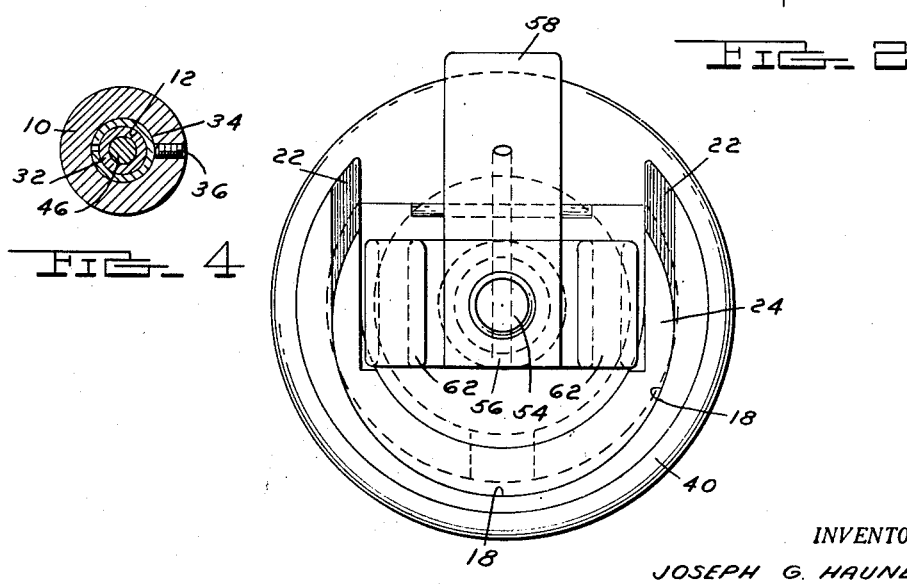
INVENTOR.
JOSEPH G. HAUNERT
BY
ATTORNEYS United States Patent Office 2,835,044
Patented May 20, 1958

2,835,044

GAUGE FOR ROCKER ARM

Joseph G. Haunert, Detroit, Mich., assignor to Freeland Gauge Company, Detroit, Mich., a corporation of Michigan Application January 31, 1955, Serial No. 485,148

5 Claims. (Cl. 33—181)

This invention relates to a gauge assembly for rocker arm adjustment and is particularly directed to a tool which can be utilized by a mechanic to establish accurately the gap between the actuating end of the rocker arm of an internal combustion engine and the stem end of an engine valve.

In the history of valve adjustment, it has been done in many cases by guess and in some cases in many garages a valve adjustment is accomplished by the use of feeler gauges which are inserted between the rocker arm and the valve stem. These are inaccurate in many cases, since they accumulate dust and grit and also become worn through continued use.

It is an object of the present invention to provide a gauge which can be conveniently applied and observed and which need not be held by the operator's hands when he is working on the engine.

It is a further object to provide such a gauge which will give an accurate indication of the valve gap which is being adjusted.

It is a further object of the invention to provide a valve gauge assembly which is designed for shop use in such a manner that it will not be affected by the usual handling it will receive in ordinary shop use.

Briefly, the invention consists of a gauge assembly, including a plunger-type indicator, a mounting housing therefor which includes a recess for receiving a rocker arm, and a recess for receiving a valve retainer washer. Within that recess is a bifurcated finger unit positioned to contact the rocker arm to establish the relationship between the valve stem and the arm during the adjustment.

Drawings accompany the specification, and the various views thereof may be briefly described as:

Figure 1, a longitudinal section of the device taken on line 1—1 of the second view, Figure 2, showing an outline of the relationship to the engine members on which it is used.

Figure 2, a longitudinal section on line 2—2 of Figure 1.

Figure 3, a bottom view of the device showing the relationship of the parts.

Figure 4, a sectional view of line 4—4 of Figure 2.

Referring to the drawings, the gauge assembly is shown in section in Figure 1 having a housing or body portion 10 which is provided with a central bore 12 at one end and an enlarged recess 14 open at the other end and open at one side 16. A second enlarged recess 18 at the open end of recess 14 is substantially circular to receive a valve washer 20 which surrounds a valve stem 21. The recess 18 is partially closed by small ledges 22 which project from the base 24 of recess 18 a slight distance so that the washer 20 may seat in the recess 18 and be retained therein by the ledges 22.

At the top end of the housing or body 10 a plunger-type gauge indicator housing 30 is mounted by a shaft or neck portion 32 which is surrounded in the bore by a split bushing 34 held in place by a set screw 36. Thus, the gauge or dial housing 30 may be adjusted vertically by maintaining a pressure on bushing 34 with screw 36 to create frictional engagement with shaft 32 and permitting manipulation of gauge housing 30. Also surrounding the gauge housing 30 as a protective guard is a dish-shaped protector housing 40 fastened suitably to the top of the housing 10 by a pin 42 and a screw 44. Below the shaft 32 is a plunger 46 which actuates the indicator in gauge housing 30, and below the plunger 46 is a second plunger 48 having a guide head 50 urged upwardly by a spring 52.

The plunger 48 extends downwardly into recess 14 and on the end 54 thereof is fastened a feeler member 56 having a manipulating projection 58 extending out through the opening 16 and having bifurcate feeler arms 60 with inwardly extending fingers 62 for contacting the lower edges of the actuating end of a rocker arm 64.

The device above described is frequently used on V8 engines, wherein the top of the block is positioned at an angle. Thus, the gauge assembly, when mounted for adjustment indication, would be positioned at an angle. The present device is designed to be adapted to that type of positionment.

As indicated above, the valve stem retainer washer 20 is seated in the recess 18 and positioned securely by the ledges 22. As it is slipped in place, the projection 58 is depressed against the action of spring 52 and the fingers 62 are slipped under the rocker arm 64. The spring 52 holds the device in position and permits the operator to use both hands in making the necessary adjustments. The indicator can be set to zero when the rocker arm is in contact with the valve stem, and then the necessary adjustment may be made as indicated on the dial indicator in housing 30. Once the adjustment is made, a depression of the projection 58 will allow the gauge assembly to be readily released.

The gauge assembly above described is equally useful by original manufacturers of internal combustion engines or repair shops where valves are being ground and adjusted. It is a simple device, the use of which is readily comprehended by mechanics in charge of this work, and it is so constructed that it will withstand the rigors of shop use. The pressures incident to its use are so light that no deflection of the parts can affect the result. There is no wedging or forcing action as might take place with feeler gages.

I claim:

1. A gauge assembly for assisting an operator in setting a valve rocker arm of an internal combustion engine, which comprises a housing having at one end an axial bore and at the other end an enlarged recess for receiving the actuating end of the rocker arm, a second enlarged recess at the open end of said first enlarged recess adapted to receive a valve retainer washer, a dial indicator having a mounting shaft adjustably mounted within said bore, a plunger on said shaft extending into said bore, a second spring-biased plunger in said bore in contact with said first plunger and projecting from said bore into said first recess, a bifurcate feeler member operably associated with said second plunger for reciprocation in said second recess, said feeler member having inwardly turned contact fingers for direct positionment against the lower side of the rocker arm, and means on said feeler member extending to one side of said first enlarged recess to permit manual operation of said feeler member for installation and removal of said gauge assembly.

2. A gauge assembly for assisting an operator in setting a valve rocker arm of an internal combustion engine which comprises a housing having at one end a first recess to receive a portion of a valve assembly as a locator and having at the other end a second recess to receive a valve indicator device, a plunger type valve indicator in said last recess, a first means in said housing between said recesses to receive laterally of said housing a rocker arm end, said means being responsive to the position of a rocker arm axially of said housing, and a second means associating said valve indicator and said means to cause reflection of the relative axial position of a valve rocker arm to the valve indicator and to serve as a retainer for said gauge assembly in operating position.

3. A device as defined in claim 2 in which the first recess is a shallow circular recess open at one side to receive a valve retainer washer.

4. A device as defined in claim 2 in which the first means is an axially movable bifurcate claw within said housing to embrace and, in one position, clamp the actuating end of a rocker arm, and the second means is a resiliently biased plunger urging said claw to said one position, and a projection on said claw extending outwardly from said housing to facilitate shifting of said claw away from said one position during lateral insertion of a rocker arm end.

5. A device as defined in claim 4 in which the second recess is a circular bore, the valve indicator has a mounting neck projecting into said bore, a split bushing around said neck in said bore, and means to compress said bushing to cause frictional engagement of said neck permitting axial adjustment of said indicator relative to said housing.

References Cited in the file of this patent

UNITED STATES PATENTS

| | | |
|---|---|---|
| 1,654,319 | Brown | Dec. 27, 1927 |
| 1,659,915 | Hilfiker | Feb. 21, 1928 |
| 2,471,106 | Hall | May 24, 1949 |
| 2,474,294 | Weeks | June 28, 1949 |